United States Patent [19]

Magyar

[11] 3,824,390
[45] July 16, 1974

[54] MULTICHANNEL MASS SPECTROMETER
[75] Inventor: John J. Magyar, Arcadia, Calif.
[73] Assignee: The Perkin-Elmer Corporation, Norwalk, Conn.
[22] Filed: Oct. 18, 1971
[21] Appl. No.: 190,223

[52] U.S. Cl.............................. 250/294, 340/228
[51] Int. Cl............................................ H01j 39/34
[58] Field of Search.... 250/41.9 G, 41.9 D, 41.95 R

[56] References Cited
UNITED STATES PATENTS
2,648,008  8/1953  Sink .................... 250/41.9 D
2,662,185  12/1953  Robinson et al............ 250/41.9 D
3,648,047  3/1972  Bushman et al. ............ 250/41.9 D FOREIGN PATENTS OR APPLICATIONS
843,956  8/1960  Great Britain............... 250/41.9 D Primary Examiner—James W. Lawrence
Assistant Examiner—B. C. Anderson
Attorney, Agent, or Firm—Edward R. Hyde, Jr.

[57] ABSTRACT

This is a multichannel mass spectrometer in which gas components of a mixture sample are ionized and the ions directed respectively to different collector cups or plates to generate voltage signals corresponding to the ion currents collected. Means are provided for initially adjusting the voltage of the output signals so that each collector output circuit produces the same signal as the others at unit partial pressure of the gas component it is adapted to measure. A reference signal is supplied and means is provided for comparing it with the sum of the collector circuit output voltages. Sensitivity control means is responsive to changes in the initially adjusted relationship of the sum of the collector output signals to the reference signal and adjusts each of the collector output signals by the same factor to maintain the sum of the collector signals in the initial adjusted relationship. Thus the collector signals will be proportional to the respective gas component partial pressures despite variations in the relative proportions of the component partial pressures, and despite changes in factors which would otherwise alter the sensitivity of the spectrometer system. Detector means is also provided to indicate an excessive change in the sum of the collector signals due to restriction of the sample inlet conduit or other unusual condition.

9 Claims, 4 Drawing Figures

MULTICHANNEL MASS SPECTROMETER

BACKGROUND OF THE INVENTION

The present invention is a multichannel mass spectrometer for measuring the proportional quantities of at least the major components of a gas mixture. In particular the invention is a mass spectrometer for continuously providing accurate measurements of the quantities of the components of a gas mixture, such as the breath of a patent being anesthetized or the atmosphere in a submarine or space capsule, even though quantities of the components vary as the measuring process proceeds.

In a mass spectrometer of the type under consideration a sample of the gas is fed into an ionizing chamber which is under a vacuum and through which a beam of electrons passes from an emissive cathode to an anode. The sample gas is admitted to the ionizing chamber through a suitable inlet, such as a conventional molecular leak, so that its gas pressure is reduced, without disturbing the composition of the gas, to a level compatible with the vacuum in the ionizing chamber. The beam of electrons ionizes the gas by electron bombardment and the resulting gas ions are accelerated out of the ionizing chamber (customarily referred to as the ion source) into an analyzing chamber by a suitable ion accelerating and focussing system. In the analyzing chamber, which is also under a vacuum, the ions of the respective gases are directed by a magnetic field into separate curved paths, the curvatures of which are determined by the mass to charge ratios of the respective ions, the ion velocity and the magnetic field strength. Ion current collector plates or cups which are placed to receive ions of the particular gases to be measured generate signals whose currents are proportional respectively to the mass to charge ratios of the ions received. The collector currents are thus proportional also to partial pressures of the particular gases whose ions are collected.

The proportional quantities of the components of interest are determined by multiplying the partial pressure measurement of each component by the same factor such that the sum of the values obtained by the multiplication is equal to unity.

SUMMARY OF THE INVENTION

It is an object of the present invention to provide simple, relatively inexpensive and accurate means for accomplishing the equivalent of the foregoing multiplication and for producing continuing outputs which correspond to the proportional quantities of the components of interest even though the relative proportions of the respective components vary as continuous sampling and measurement proceed.

A further object is to provide control means for maintaining the sensitivity of the spectrometer despite changes in the operation of the apparatus which would otherwise degrade or vary the sensitivity. Examples of these changes include changes in the collector outputs due to aging of the collector cups or plates, changes in position of the cathode or anode in the ionizing chamber, a change in the level of vacuum in the ionizing chamber, and/or a change in the ambient temperature.

Another object is to provide detector means to indicate a reduction in the effective quantity of sample in the ionizing chamber which might result from restriction of the sample inlet, from maladjustment of the molecular leak mechanism which is customarily provided for adjusting the molecular and viscous flow and of a sample gas into the ionizing chamber, or from an excessive change in the sensitivity of the system.

These and other objects, features and advantages are provided in the mass spectrometer of this invention by circuitry for summing the output signals of the collectors and comparing the sum with a reference signal. The gains of the collector outputs are adjustable for initially setting them so that each collector produces the same signal at unit partial pressure of the gas component it is adapted to measure, and so that their sum equals the reference signal.

Though the critical relationships for determining the relative proportions of the gas components of interest are the relationship between the ion currents at the collectors, the system is most conveniently adapted to have the adjustments made, and to have the measurements calibrated with reference to, voltage levels. Since the voltages can be made proportionately larger in relation to the currents involved by appropriate selection of the resistances, voltages are easier to work with and provide more accurate adjustments and readout measurements. It will therefore be understood that the voltage values and relationships described hereinafter could alternatively be expressed in terms of current.

The above-mentioned gain adjustment may be made in any suitable manner, such as by providing means for adjusting the gain of electrometers which are utilized in output circuits from the collectors or by plugging in combinations of fixed value resistors to produce the requisite output values. In the embodiment described herein this gain adjustment is made by appropriately adjusting variable resistors in voltage controlled gain elements that are in the collector output circuits and that are part of the sensitivity control means which is a particular feature of this invention.

In accordance with the invention sensitivity control means is actuated in response to variation of the sum of the collector output voltages from equality with the reference voltage and it operates to change the gain of each of the collector output circuits by the same amount until the sum of the collector output voltages is restored to equality with the reference voltage. In general, the practicality of maintaining uniform sensitivity in this manner is based on the fact that the most significant sensitivity changes which limit the reliability of a mass spectrometer are due to effects, such as aging of the collector cups or other elements, movement of the cathode or anode from their original position, changes in the level of vacuum in the ionizing chamber, and/or changes in the ambient temperature, which alter all the collector outputs by some factor.

In the preferred embodiment of the invention described herein the requisite gain adjustment is determined and applied by means of a duty cycle modulator unit which actuates voltage controlled gain elements in the respective collector output circuits.

The duty cycle modulator produces a square wave output such that the durations of the wave peaks are proportional to the relation between the reference voltage and the total of the output voltages of the collector circuits. The reference voltage is normally selected so that the duration of each wave peak is about equal to the time between them when the instrument is initially adjusted for operation.

The voltage controlled gain elements are switching elements which are turned on by the output waves from the duty cycle modulator unit and turn off between waves. When they are on they cause the same maximum gain in each of the collector output circuits; when they are off they short out these circuits. Integrating means is provided to average out the output voltage.

In order to detect an excessive change in the sum of the collector signal voltages, due for example, to a large change in sensitivity or a restriction in the sample inlet conduit, the above described elements of the sensitivity control circuitry are selected so that an increase in this sum beyond a predetermined point is more than can be brought back down to the level of the reference voltage by normal operation of the sensitivity control means. In this situation the duty cycle modulator unit produces a continuous peak output, so that the voltage controlled gain element remains on with result that the output voltage of each of the collector output circuits is at a maximum. A detector circuit is provided to respond to this condition and to actuate a suitable fault signal, such as a light, so that the instrument operator can correct the faulty condition.

DESCRIPTION OF THE DRAWINGS

The invention is described in detail below with reference to an illustrative embodiment shown in the accompanying drawings in which.

DETAILED DESCRIPTION

Figure 1:
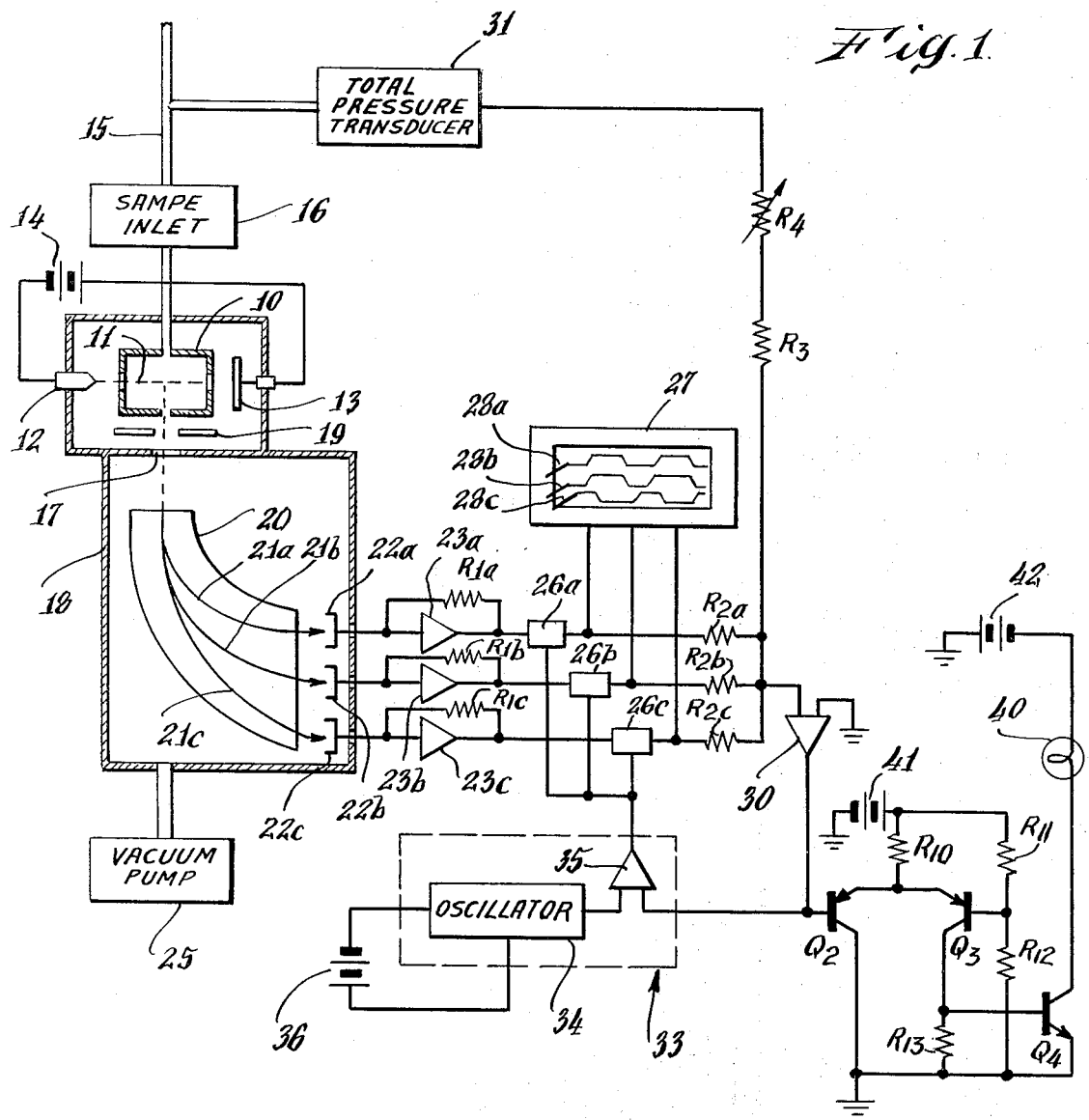
FIG. 1 is a schematic representation of a mass spectrometer embodying the invention.

A mass spectrometer in accordance with the present invention, as shown in FIG. 1, includes an ionizing chamber 10 under a vacuum through which an electron beam 11 is passed from an emissive cathode 12 to an anode 13, the cathode 12 being energized by power from a source indicated at 14. A mixture of gases to be analyzed coming from a source not shown, is conducted by a conduit 15, such as a capillary tube, to a suitable sample inlet device 16 which admits a sample of the gas into the ionizing chamber 10 at reduced pressure. The inlet device 16, which is suitably a conventional type of molecular leak, reduces the pressure of the gas sample, without disturbing its composition, to a level compatible with the degree of vacuum provided in the ionizing chamber and the ion currents required. The gas sample in the ionizing chamber is ionized by electron bombardment and the resulting ions are accelerated through an aperture 17 into an analyzing chamber 18 by ion focussing lenses (electrodes) indicated at 19 between the outlet from the ionizing chamber 10 and the aperture 17.

It will be appreciated that other ionizing means could be substituted for the electron beam generating arrangement illustrated. For example, a cold cathode emitter such as an electron multiplier which produces electrons at its output in proportion to an input signal and voltage could be used. Another alternative would be to ionize the gas mixture by means of a point source of high voltage in the proximity of the sample of the gas mixture in chamber 10 and to control the flow of ions to the collectors by means of an accelerating grid. Still another alternative would be to apply ultraviolet light to ionize the gases and to vary the ionization level by a shutter for controlling the light applied, or by varying the intensity of the light source.

In the analyzing chamber 18, which is also under vacuum, the stream of gas ions are segregated by a magnetic field, indicated at 20, into separate curved paths 21a, b and c of different curvature in accordance with their respective mass to charge ratios. Ion current collector cups illustrated by the collector cups 22a, b and c are placed for ions of the particular gases of interest in the mixture to impinge upon them and produce signal currents proportional to the masses, and hence to the partial pressures, of the respective gases. Electrometers 23a, b and c connected respectively to the collector cups 22a, b and c amplify the collector currents and respectively put out voltages proportional to the ion currents collected.

In order to assure that the voltages from the electrometers 23a, b and c represent the true pressures of the gases whose ions are collected at the collector cups 22a, b and c, feedback resistors R1a, b and c are connected across the respective electrometers and are chosen to provide maximum electrometer output consistent with the operating range of the instrument.

The operating pressures, namely vacuums in the ionizing chamber 10 and the analzing chamber 18, are provided by a vacuum pump 25 connected into the analyzing chamber 18. The vacuum pump 25 may be an ion pump which would have a roughing pump, not shown, associated therewith for starting the creation of the vacuum in a conventional manner.

The outputs from the electrometers 23a, b and c are connected through voltage controlled gain elements 26a, b and c which incorporate both the means for initially adjusting the voltages in the output circuits from the collectors and the sensitivity control means that are subsequently described in detail. The output sides of the gain elements 26a, b and c are connected in parallel to a strip chart recorder 27 and through resistors R2a, b and c, to a high gain summing amplifier 30.

The strip chart recorder, which is a conventional type, has stylus pens 28a, b and c connected to be moved over the chart in response to voltages received from the collectors. When the spectrometer is properly adjusted in the manner subsequently described, the levels of the respective chart lines drawn by the stylus pens correspond to the proportional amounts of the gas components being measured.

The summing amplifier 30 is also connected to receive a reference voltage through a fixed valve resistor R3 which is in series with a variable resistor R4. The variable resistor R4 is provided as means to adjust the level of the reference voltage. In the form shown in FIG. 1 the reference voltage is supplied by a total pressure transducer 31 which is connected into the conduit 15 to produce a reference signal proportional to the total pressure of the gas mixture of the supply.

Figure 1A:
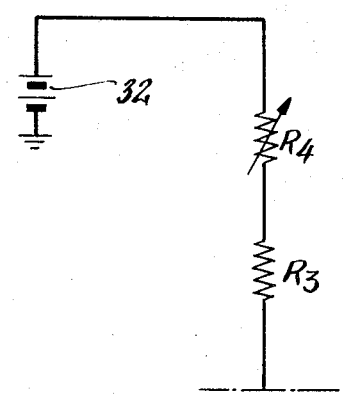
FIG. 1a is a schematic representation of an alternative means for providing the reference voltage utilized in the instrument in FIG. 1.

FIG. 1a shows an alternative arrangement for supplying this reference voltage from an unvarying voltage source indicated at 32. As in the FIG. 1 arrangement the reference voltage is fed to the summing amplifier 30 through variable resistors R4 and a fixed valve resistor R3. This arrangement is adapted for use in systems in which the gas mixture is supplied to the spectrometer at a substantially constant pressure.

The voltages of the collector output circuits, from the output sides of the resistors R2a, b and c, are totalled at the summing amplifier 30. The summing amplifier compares this total with the reference voltage from resistor R3 and applies a signal proportional to any difference to a duty cycle modulator unit 33 which is connected to control the operation of each of the gain elements 26a, b and c.

The duty cycle modulator unit 33 consists of an oscillator 34 and an amplifier 35. The oscillator 34 is connected to a suitable power source, indicated at 36, for producing a regular sequence of uniform triangular wave signals which are applied to the amplifier 35. The output of the summing amplifier 30, which is applied to the amplifier 35, is a d.c. signal whose voltage is proportional to differences between the reference voltage from resistor R3 and the total of the voltages from the electrometers 23a, b and c. The amplifier 35, which is suitably a differential amplifier used as a comparator, combines the d.c. signal from summing amplifier 30 with the triangular signals from oscillator 34 and produces a square wave output voltage in which the durations of the wave peaks vary in accordance with changes in the relationship between the reference voltage and the total of the voltages from the gain elements 26a, b and c.

If the total of the voltages from the gain elements fall below the reference voltage, the voltage from summing amplifier 30 increases, the duration of the wave peaks from the amplifier 35 becomes shorter and the time between them becomes longer. The summing amplifier 30, and the oscillator 34 and the amplifier 35 of the duty cycle modulator circuit 33, are selected so that when the total of the voltages from the gain elements 26a, b and c, appearing at the output sides of resistors R2a, b and c, equal the reference voltage, the durations of the wave peaks of the voltage from amplifier 35 are approximately equal to the time between.

The gain elements 26a, b and c are switching elements which cause maximum gain in the collector output circuit when they are off, and short out these circuits when they are on. The several gain elements are the same and their structure and operation are described hereafter with reference to gain element 26a which is representative and which is illustrated in detail in FIG. 2.

Figure 2:
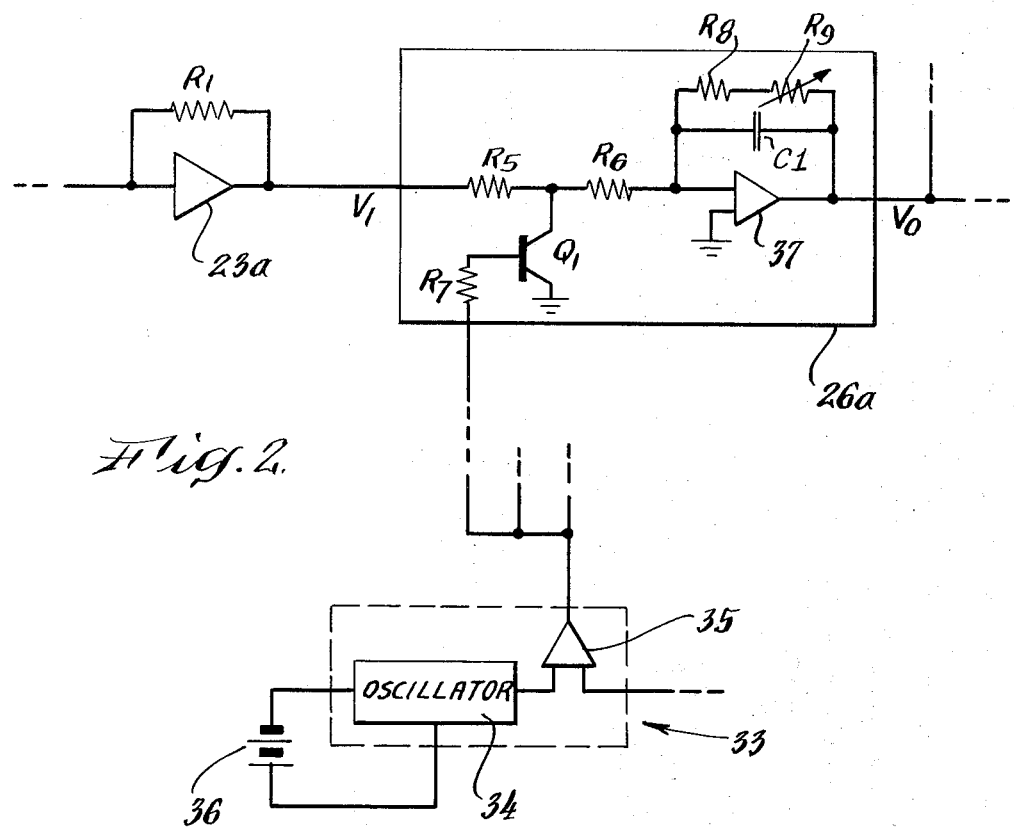
FIG. 2 is an enlarged schematic representation of one of the several similar voltage controlled gain elements which are part of the instrument illustrated in FIG. 1.

As shown in FIG. 2 each gain element consists of an NPN switching transistor Q1 and an amplifier 37. The output of the associated electrometer, 23a, is connected through resistors R5 and R6 to the amplifier 37. Transistor Q1 has its base connected through a resistor R7 to receive output signals from the amplifier 35 of the duty cycle modulator unit 32; its emitter is grounded and its collector is tapped into the line between electrometer 23a and amplifier 37, between resistors R5 and R6.

Connected across the amplifier 37 is an integrating circuit, consisting of a capacitor C1 in parallel with series connected fixed value resistor R8 and variable resistor R9, for averaging out the amplifier 37 output to the summing amplifier 30. The variable resistors R9 in the several gain elements provide means for adjusting the initial balance of the system so that the total of the output voltages of the several collector circuits from the resistors R2a, b and c equal the reference voltage from resistor R3 when the instrument is initially adjusted for measuring the proportion of the components of a particular combination of gases.

The value of transistor Q1 is selected in relation to the output of the amplifier 35 for the transistor Q1 to be switched on, to its conducting state, by the peaks of the square wave voltage from the amplifier 35 and to be switched off during the time between the peaks. Thus, if the output signal from the summing amplifier 30 increases as a result of the total of the voltages from the collector circuits being less than the reference voltage, the voltage peaks from amplifier 35 are relatively short. Consequently, the transistors Q1 in each one of the gain elements 26a, b and c, are off longer than they are on, which increases the gain thereby. Produced in each of the collector circuits. These increases in gain thus restore equality between the total of the voltages from the several collector circuits and the reference voltage so that the transistor Q1 then switches on and off at equal intervals the system is then in balance and the output readings are accurate.

Figure 3:
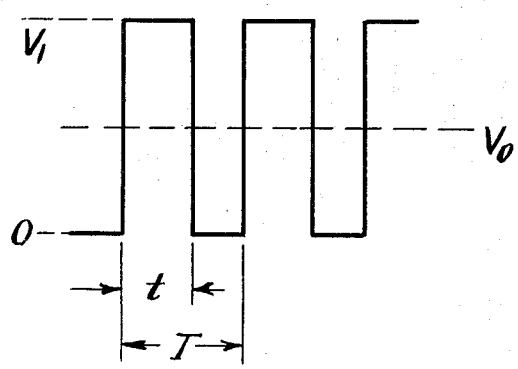
FIG. 3 is a representation of the square wave output of the duty cycle modulator unit which is also part of the instrument illustrated in FIG. 1.

FIG. 3 illustrates the relationship between the off and on times of the transistors Q1 in the several gain elements and the consequent relationship between the input and output voltages, Vi and Vo respectively, of each of the gain elements 26a, b and c. If $t$ is the off time of transistors Q1 and T is the sum of an off time and the following on time, then the output voltage Vo of each of the gain elements, and hence the output voltages of each of the collector circuits, is shown by the relationship $Vo = Vi \times t/T$.

By having the gain elements 26a, b and c actuated by a high gain feedback summing amplifier 30, the gain elements are suitably constructed as described above to pass only one polarity of signal.

The arrangement shown is adapted to correct the balance of the system to eliminate the effect of the normal change in sensitivity to be expected during the operation of the instrument. If, however, the sensitivity changes by more than a certain amount, or if there is an insufficient amount of sample gas in the ionizing chamber — due to a restriction in the sample inlet for example — the difference between the total of the output voltages of the collector circuits and the reference voltage would be larger than the difference caused by the usual change in sensitivity, expected from aging for example. In order to detect such a large difference between the total of the collector circuit output voltages and the reference voltage, the summing amplifier 30 and oscillator 34 and amplifier 35 of the duty cycle modulator unit, are selected to have relative characteristics such that the relatively high output voltage of the summing amplifier 30 resulting from this large difference in voltages will be so large in relation to the operating relationship amplifier 35 and oscillator 34 that they will not operate to turn transistor Q1 on. Consequently the collector circuits will be driven up to their maximum gain at which the total of their voltages is far enough above the reference voltage so that the summing amplifier 30 will continue to produce a relatively high output voltage. This condition is indicated to the operator of the instrument by the detector circuit which is shown operatively connected to the output of the summing amplifier 30 at the right hand side of the spectrometer circuitry illustrated in FIG. 1.

As shown this detector circuit includes two PNP transistors Q2 and Q3, an NPN transistor Q4, and a light 40, or other electrically operated alarm or signal device. The transistors Q2 and Q3, which are connected in a form of voltage dividing circuit, have their emitters connected together, with both emitters being connected through a resistor R10 to a source of voltage indicated at 41. Transistor Q2 has its base connected to receive the output of the summing amplifier 30; its collector is grounded and it is biased to be on during the normal range of voltage output from amplifier 30 but to be switched off if the output voltage of amplifier 30 increases to a level which, as described above, indicates a large change in sensitivity of the instrument or an insufficient amount of a sample gas in the ionizing chamber. The base of transistor Q3 is connected through a resistor R11 to the voltage source 41 and through a resistor R12 to ground. The collector of transistor Q3 is connected to ground through a resistor R13 and to the base of transistor Q4. Transistor Q4 has its emitter grounded and its collector connected to the light 40, which is connected to be operated from a voltage source 42, when the transistor Q4 is on. If the output voltage of the amplifier 30 is within the range for correcting the usual variations in sensitivity of the instrument, transistor Q2 is on and the voltage source 41 is grounded. If the amplifier 30 output is increased over a predetermined amount, indicating restriction of the sample inlet or too great a change in sensitivity, transistor Q2 is shut off and changes the bias of transistor Q3 so that transistor Q3 switches on and switches transistor Q4 on. This turns the light 40 on and thus alerts the operator to check for a faulty condition.

The instrument is adjusted for operation for analyzing and monitoring the proportional amounts of the component gases of a mixture by feeding into it a reference gas containing all the components of interest in known proportions. The voltage outputs of the collector circuits are measured at the output sides of the gain elements 26a, b and c by utilizing the strip chart recorder 27 or by a voltmeter. The voltages in the collector circuits are then adjusted by means of the variable resistors R9 in the respective gain elements so that the voltage from each gain element corresponds to the known percentage of the component gas measured by the respective collector circuits. Thus the ratio of the voltage output of the gain element of each collector circuit, as adjusted, to the total output of the gain elements of the several collector circuits is the same as the ratio of the partial pressure of the gas component measured by the respective circuit to the total of the partial pressures of all the gas components measured. The resistors R2a, b and c, which are provided between the gain elements and the summing amplifier 30 to protect the gain elements and strip chart recorder 27 from harmful effects of reverse voltage flow, are given values such that the foregoing ratios are preserved at their outputs to the summing amplifier. By this simple technique the voltages of the several collector circuits are adjusted in relation to each other so that the voltage through each of them is the equivalent of the product of a selected voltage per unit partial pressure, which is the same for each circuit, and the known partial pressures of the gas components measured by the respective collector circuit.

The reference voltage is then adjusted, by means of the variable resistor R4, to equal the total output voltage of the several collector circuits at the output sides of the resistors R2a, b and c. The instrument is then ready for analyzing and monitoring components of interest in a test gas mixture of unknown composition.

In the apparatus illustrated in FIG. 1 the spectrometer is shown adapted for determining the proportional amounts of three component gases of a mixture, such as a mixture of $N_2$, $O_2$ and $CO_2$, as measured by the circuits from the electrometers 23a, b and c, respectively. It may of course be adapted for determining the proportional amounts of any selected number of particular gases in different gas mixtures by providing the appropriate number of collector cups 22 and associated circuitry.

The following example illustrates the relative values of components and voltages in a spectrometer that is adapted for measuring the proportionate parts of $N_2$, $O_2$ and $CO_2$ of a mixture of these gases in which a reference sample of this mixture consists of 70% $N_2$, 25% $O_2$, and 5% $CO_2$. At a total pressure of 800 torr the partial pressures of the components would therefore be 560, 200 and 40 torr respectively. In order to obtain the largest outputs possible from the electrometers 23a, b and c for this mixture in the test spectrometer, the values of the feedback resistors R1a, b and c were $5(10^{10})$, $2(10^{11})$ and $10^{12}$ ohms, respectively.

The collector circuits were then adjusted by means of the variable resistors R9 until this voltage outputs from the gain elements 26a, b and c were 7.0, 2.5 and 0.5 volts respectively. The reference voltage was then adjusted to produce 10 volts less an amount to compensate for the voltage drop introduced by the resistors R2a, b and c.

Mass spectrometers incorporating adjusting means, sensitivity control means and detector means in accordance with this invention are adapted for accurately monitoring one or more components of a gas mixture and are useful for many varied purposes including, for example, monitoring the components of the atmosphere in aircraft, spacecraft and undersea craft and monitoring components of anesthetic or other special gas mixtures used for medical purposes.

What is claimed:

1. A multichannel mass spectrometer for determining the proportional quantities of the components of a gas mixture including means for ionizing a sample of the gas mixture, a plurality of collectors for separately collecting ions of the respective components of interest and a plurality of collector output circuits respectively from the collectors and each incorporating means for generating a voltage proportional to the respective ion current of the ions collected, and in combination: means for maintaining the sensitivity of the spectrometer comprising voltage summing means connected to receive and total the voltages from the collector output circuits, a reference voltage source connected to apply a predetermined reference voltage to the summing means, said summing means being adapted to produce an output signal proportional to the difference between said total of the collector output circuit voltages and said reference voltage, modulator means connected to receive the output signals from said summing means and producing substantially square waves of voltage such that the ratio of the duration of the wave peaks to th time between is proportional to the difference between said total of the collector output circuit voltages and said reference voltage, and gain control means in each of the collector output circuits for varying the collector voltage outputs each by the same factor in proportion to the strength of the summing means output signal, said gain control means each comprising switch means connected to be actuated by voltage waves from said modulator means for connecting the respective collector output circuits to ground during the peaks of said voltage waves, and each collector circuit including means for averaging its output to said summing means.

2. The mass spectrometer of claim 1 in which each collector output circuit additionally includes independently operable means for adjusting the output voltages of the respective circuits to the summing means.

3. The mass spectrometer of claim 1 in which said reference voltage source is a pressure transducer connected for producing a voltage that is proportional to the total pressure of said sample of the gas mixture.

4. The mass spectrometer of claim 1 including means for varying the level of the reference voltage to said summing means.

5. The mass spectrometer of claim 1 in which said means in each collector circuit for averaging its output to the summing means comprises an amplifier and across this amplifier an integrating circuit provided by resistance means and a capacitor in parallel.

6. The mass spectrometer of claim 5 in which said resistance means includes a variable resistor as means for adjusting the output voltages of the respective collector output circuits to the summing means.

7. The mass spectrometer of claim 1 including alarm signal means connected to receive said signal from the summing means and to be actuated thereby when the value of said signal exceeds a predetermined value.

8. A multichannel mass spectrometer for determining the proportional quantities of the components of a gas mixture including means for ionizing a sample of the gas mixture, a plurality of collectors for separately collecting ions of the respective components of interest and a plurality of collector output circuits respectively from the collectors and each incorporating means for generating a voltage proportional to the respective ion current of the ions collected, and in combination: means for maintaining the sensitivity of the spectrometer comprising voltage summing means connected to receive and total the voltages from the collector output circuits, a reference voltage source connected to apply a predetermined reference voltage to the summing means, said summing means being adapted to produce an output signal proportional to the difference between said total of the collector output circuit voltages and said reference voltage, gain control means in each of the collector output circuits for varying their voltage outputs to the summing means, said gain control means each being connected to receive the output signals of the summing means and to vary the voltages in the collector output circuits each by the same factor in proportion to the strength of the summing means output signal, and alarm signal means connected to receive said output signal from the summing means and to be actuated thereby when the value of said output signal exceeds a predetermined value, said alarm signal means comprising a source of electric power, first, second and third switches, and an alarm device connected to be turned on and off by the third switch when the third switch is turned on and off, said first switch being connected to be switched on and off by said summing applifier output signal when said signal has a value, respectively, less than and greater than said predetermined value, said second switch being a transistor connected to be switched between its conductive and non-conductive states by the first switch when the first switch is off and on, respectively, said transistor being connected to the third switch and being adapted to apply levels of power from said source to the third switch to turn the third switch on when said transistor is on and to turn the third switch off when it is off.

9. The mass spectrometer and alarm signal means of claim 8 in which said second switch is a PNP transistor having its base and its emitter both connected respectively through first and second resistors to said power source, said first switch having one terminal connected between said emitter and said second resistor and another terminal connected to ground so that the emitter of said transistor is connected to ground when the first switch is on, the base of said transistor being connected to ground through a third resistor, the values of said transistor and said resistors being selected so that the transistor is biased to its conductive state when the first switch is off and is biased to its non-conductive state when the first switch is on.

* * * * *